US011366269B2

(12) United States Patent
Bian

(10) Patent No.: US 11,366,269 B2
(45) Date of Patent: Jun. 21, 2022

(54) EDGE COUPLERS WITH A PARTIALLY-ETCHED INVERSE TAPER

(71) Applicant: GLOBALFOUNDRIES U.S. Inc., Santa Clara, CA (US)

(72) Inventor: Yusheng Bian, Ballston Lake, NY (US)

(73) Assignee: GlobalFoundries U.S. Inc., Santa Clara, CA (US)

( * ) Notice: Subject to any disclaimer, the term of this patent is extended or adjusted under 35 U.S.C. 154(b) by 0 days.

(21) Appl. No.: 16/985,645

(22) Filed: Aug. 5, 2020

(65) Prior Publication Data
US 2022/0043207 A1 Feb. 10, 2022

(51) Int. Cl.
*G02B 6/122* (2006.01)
*G02B 6/136* (2006.01)
*G02B 6/12* (2006.01)

(52) U.S. Cl.
CPC .......... *G02B 6/1228* (2013.01); *G02B 6/136* (2013.01); *G02B 2006/12061* (2013.01); *G02B 2006/12147* (2013.01); *G02B 2006/12176* (2013.01); *G02B 2006/12195* (2013.01)

(58) Field of Classification Search
CPC .................................................... G02B 6/1228
See application file for complete search history.

(56) References Cited

U.S. PATENT DOCUMENTS

| 5,499,256 | A | * | 3/1996 | Bischel | ................... | H01S 5/141 |
| | | | | | | 372/12 |
| 8,787,129 | B1 | * | 7/2014 | Jin | ....................... | G11B 5/4866 |
| | | | | | | 369/13.33 |
| 10,429,582 | B1 | | 10/2019 | Bian et al. | | |
| 2002/0131744 | A1 | * | 9/2002 | Evans | ..................... | G02B 6/136 |
| | | | | | | 385/129 |
| 2006/0115215 | A1 | * | 6/2006 | Liu | ...................... | G02B 6/1228 |
| | | | | | | 385/132 |

(Continued)

FOREIGN PATENT DOCUMENTS

| DE | 19538648 A1 | * | 4/1996 | ........... H01S 5/0265 |
| JP | 2004319668 A | * | 11/2004 | ........... H01S 5/0265 |

OTHER PUBLICATIONS

Arnab Dewanjee, Jan Niklas Caspers, James Stewart Aitchison, and Mo. Mojahedi, "Demonstration of a compact bilayer inverse taper coupler for Si-photonics with enhanced polarization insensitivity," Opt. Express 24, 28194-28203 (2016).

(Continued)

*Primary Examiner* — Charlie Y Peng
(74) *Attorney, Agent, or Firm* — Thompson Hine LLP; Anthony Canale

(57) ABSTRACT

Structures including an edge coupler and methods of fabricating a structure including an edge coupler. The edge coupler includes a waveguide core having an end surface and a tapered section that terminates at the end surface. The tapered section of the waveguide core includes a slab layer and a ridge layer on the slab layer. The slab layer and the ridge layer each terminate at the end surface. The slab layer has a first width dimension with a first width at a given location along a longitudinal axis of the waveguide core, the ridge layer has a second width dimension with a second width at the given location along the longitudinal axis of the waveguide core, and the first width is greater than the second width.

15 Claims, 4 Drawing Sheets

(56) References Cited

U.S. PATENT DOCUMENTS

2015/0346430 A1* 12/2015 Li .................. G02B 6/132
385/28
2016/0178841 A1* 6/2016 Oka .................. G02B 6/126
385/11

OTHER PUBLICATIONS

Zhongfa Liao, S. J. Wagner, M. Z. Alam, V. Tolstikhin, and J. Stewart Aitchison, "Vertically integrated spot-size converter in AlGaAs—GaAs," Opt. Lett. 42, 4167-4170 (2017).
G. Roelkens, D. Van Thourhout, R. Baets, R. Nötzel, and M. Smit, "Laser emission and photodetection in an InP/InGaAsP layer integrated on and coupled to a Silicon-on-Insulator waveguide circuit," Opt. Express 14, 8154-8159 (2006).
K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.
M. Rakowski, C. Meagher, K. Nummy, A. Aboketat, J. Ayala, Y. Bian, B. Harris, K. Mclean, K. McStay, A. Sahin, L. Medina, B. Peng, Z. Sowinski, A. Stricker, T. Houghton, C. Hedges, K. Giewont, A. Jacob, T. Letavic, D. Riggs, A. Yu, and J. Pellerin, "45nm CMOS—Silicon Photonics Monolithic Technology (45CLO) for next-generation, low power and high speed optical interconnects," in Optical Fiber Communication Conference (OFC) 2020, OSA Technical Digest (Optical Society of America, 2020), paper T3H.3.
Yusheng Bian et al., "Edge Couplers With Stacked Layering" filed Apr. 27, 2020 as U.S. Appl. No. 16/859,347.
Mu, X.; Wu, S.; Cheng, L.; Fu, H., "Edge Couplers in Silicon Photonic Integrated Circuits: A Review", Published Feb. 24, 2020, Appl. Sci. 10, 1538.

* cited by examiner

EDGE COUPLERS WITH A PARTIALLY-ETCHED INVERSE TAPER

BACKGROUND

The present invention relates to photonics chips and, more specifically, to structures including an edge coupler and methods of fabricating a structure including an edge coupler.

Photonics chips are used in many applications and systems such as data communication systems and data computation systems. A photonics chip integrates optical components, such as waveguides, optical switches, edge couplers, and polarizers, and electronic components, such as field-effect transistors, into a unified platform. Among other factors, layout area, cost, and operational overhead may be reduced by the integration of both types of components.

An edge coupler is commonly used for coupling laser light between a semiconductor laser and optical components on the photonics chip. The edge coupler may include a narrowed section of a waveguide core that has a significantly smaller mode size than the beam of laser light emitted by the semiconductor laser. Inefficiencies in the coupling between the semiconductor laser and the edge coupler may occur due to the mismatched mode size, as well as differences in mode shape. These inefficiencies may give rise to a significant coupling loss.

Improved structures including an edge coupler and methods of fabricating a structure including an edge coupler are needed.

SUMMARY

In an embodiment of the invention, a structure includes an edge coupler having a waveguide core with an end surface and a tapered section that terminates at the end surface. The tapered section of the waveguide core includes a slab layer and a ridge layer on the slab layer. The slab layer and the ridge layer each terminate at the end surface. The slab layer has a first width dimension at a given location along the longitudinal axis of the waveguide core, the ridge layer has a second width dimension at the given location along the longitudinal axis of the waveguide core, and the first width dimension is greater than the second width dimension.

In an embodiment of the invention, a method of forming a structure for an edge coupler is provided. The method includes forming a waveguide core that includes an end surface and a tapered section that terminates at the end surface. The tapered section of the waveguide core includes a slab layer and a ridge layer on the slab layer, and the slab layer and the ridge layer each terminate at the end surface. The slab layer has a first width dimension at a given location along the longitudinal axis of the waveguide core, the ridge layer has a second width dimension at the given location along the longitudinal axis of the waveguide core, and the first width dimension is greater than the second width dimension.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
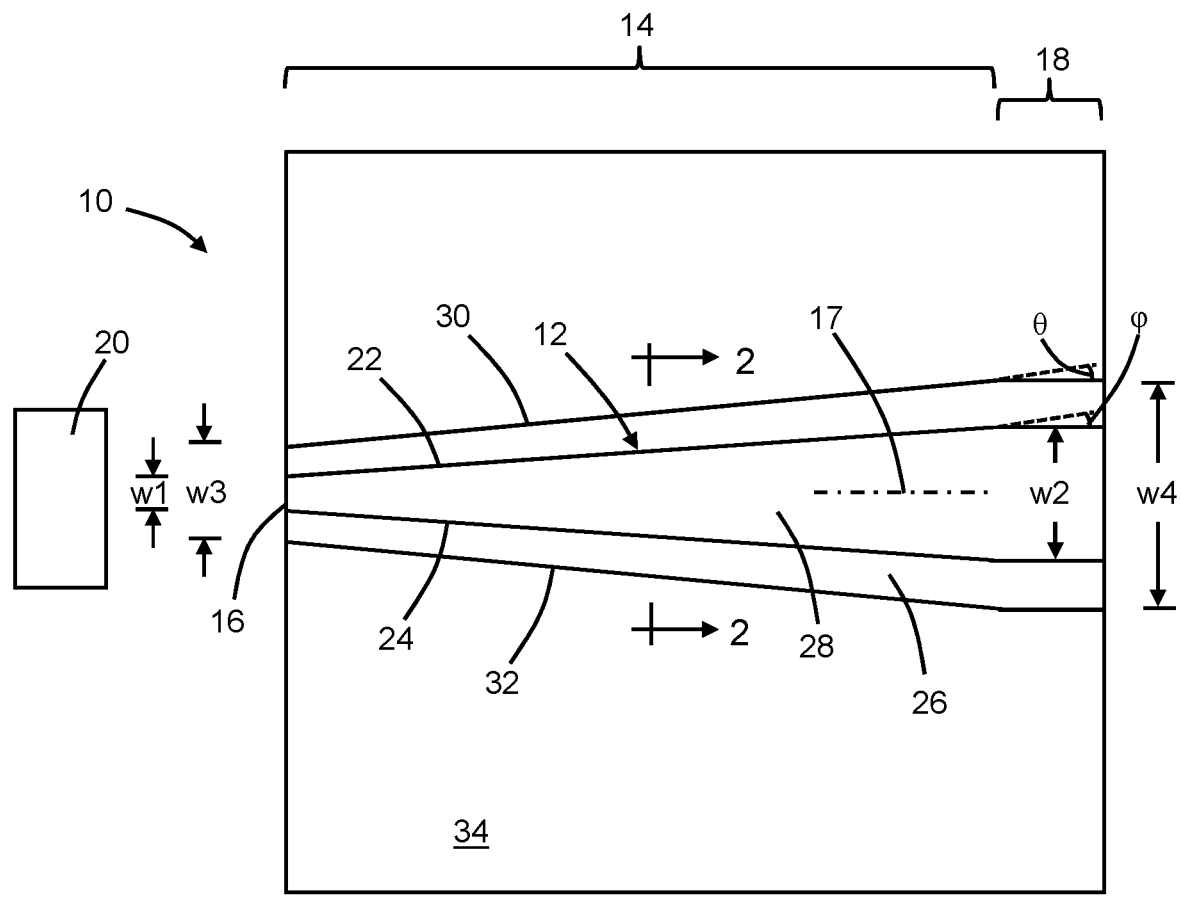
FIG. 1 is a top view of a structure for an edge coupler at an initial fabrication stage of a processing method in accordance with embodiments of the invention.
Figure 2:
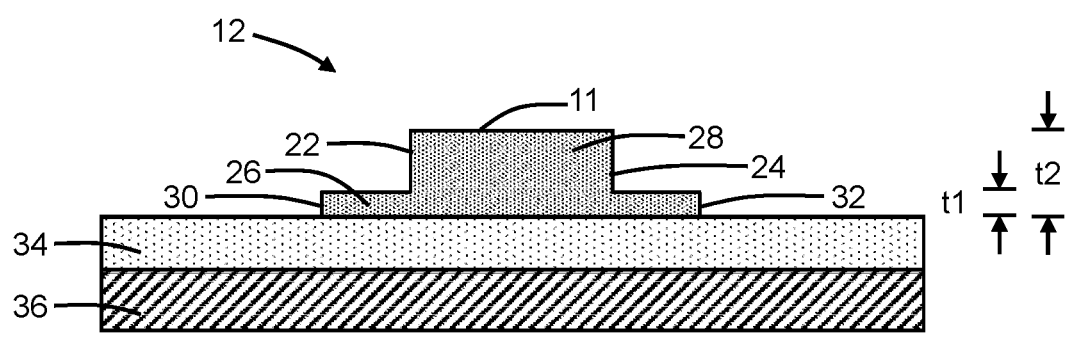
FIG. 2 is a cross-sectional view of the structure taken generally along line 2-2 in FIG.

With reference to FIGS. 1, 2 and in accordance with embodiments of the invention, a structure 10 for an edge coupler includes a waveguide core 12 having a tapered section 14, an end surface 16 that is positioned adjacent to a laser 20, and a non-tapered section 18 adjoined and connected to the tapered section 14. In an embodiment, the non-tapered section 18 of the waveguide core 12 may be a straight section located immediately adjacent to the tapered section 14. The waveguide core 12 may be extend axially with alignment along a longitudinal axis 17. In the representative embodiment, the end surface 16 terminates the tapered section 14 and provides a surface of given cross-sectional area that is butted with the laser 20 and that participates in receiving laser light emitted from the laser 20. The tapered section 14, which is inversely tapered, may extend lengthwise parallel to the longitudinal axis 17 from the end surface 16 to an opposite end at a transition to the non-tapered section 18. The tapered section 14 has a length measured as a distance along the longitudinal axis 17 from the end surface 16 to the transition between the tapered section 14 and the non-tapered section 18.

The tapered section 14 and non-tapered section 18 of the waveguide core 12 include respective portions of a slab layer 26 and a ridge layer 28. The ridge layer 28 is positioned on and over the slab layer 26 to define a rib-type waveguiding structure. The slab layer 26 has a thickness, t1, that is less than a thickness, t2, of the ridge layer 28. The waveguide core 12 has a top surface 11 and a bottom surface opposite to the top surface 11 in a vertical direction, and the thickness, t2, of the ridge layer 28 may be measured from the top surface 11 to the bottom surface. Over the length of the tapered section 14, the slab layer 26 includes opposite sidewalls or side surfaces 30, 32 that diverge with increasing distance from the end surface 16. The ridge layer 28 of the waveguide core 12 also includes opposite sidewalls or side surfaces 22, 24 that diverge with increasing distance from the end surface 16 over the length of the tapered section 14. The separation between the side surfaces 22, 24 of the ridge layer 28 may be constant in the non-tapered section 18 and, similarly, the separation between the side surfaces 30, 32 of the slab layer 26 may be constant in the non-tapered section 18.

In the tapered section 14, the slab layer 26 has a width dimension that increases with increasing distance from the end surface 16 and defines an inverse taper characterized by a taper angle, θ. The increasing width dimension of the slab layer 26 of the waveguide core 12 over the length of the tapered section 14 may end at the transition to the non-tapered section 18. In the tapered section 14, the ridge layer 28 likewise has a width dimension that increases with increasing distance from the end surface 16 and defines an inverse taper characterized by a taper angle, φ. The increasing width dimension of the ridge layer 28 of the waveguide core 12 over the length of the tapered section 14 may end at the transition to the non-tapered section 18.

The ridge layer 28 of the waveguide core 12 may have a width, W1, between the side surfaces 22, 24 at the end surface 16, and the ridge layer 28 of the waveguide core 12 may have a larger width, W2, between the side surfaces 22, 24 at the transition from the tapered section 14 to the non-tapered section 18. The width, W1, of the ridge layer 28 may range from 0.01 times the wavelength of the laser light received from the laser 20 to 0.1 times the wavelength of the laser light received from the laser 20. The width, W2, of the ridge layer 28 may be greater than 0.25 times the wavelength of the laser light received from the laser 20.

At any given location along the longitudinal axis 17 in the tapered section 14, the ridge layer 28 may have a width dimension that varies between a minimum width equal to the width, W1, and a maximum width equal to the width, W2. In an embodiment, the width dimension of the ridge layer 28 may linearly vary between the width, W1, and the width, W2, based on a linear function such that the taper angle, $\varphi$, is constant. In an alternative embodiment, the ridge layer 28 may have a width dimension that non-linearly varies between the width, W1, and the width, W2, based on a non-linear function, such as a quadratic, parabolic, or exponential function, over its length such that the taper angle, $\varphi$, varies.

The slab layer 26 of the waveguide core 12 may have a width, W3, between the side surfaces 30, 32 at the end surface 16, and the slab layer 26 of the waveguide core 12 may have a larger width, W4, between the side surfaces 30, 32 at the transition from the tapered section 14 to the non-tapered section 18. At any given location along the longitudinal axis 17 in the tapered section 14, the slab layer 26 may have a width dimension that varies between a minimum width given by the width, W3, and a maximum width given by the width, W4. In an embodiment, the width dimension of the slab layer 26 may linearly vary between the width, W3, and the width, W4, based on a linear function such that the taper angle, $\theta$, is constant. In an alternative embodiment, the slab layer 26 may have a width dimension that non-linearly varies between the width, W3, and the width, W4, based on a non-linear function, such as a quadratic, parabolic, or exponential function, over its length such that the taper angle, $\theta$, varies.

At the end surface 16, the width, W3, of the slab layer 26 is greater than the width, W1, of the ridge layer 28. At the transition from the tapered section 14 to the non-tapered section 18, the width, W4, of the slab layer 26 is greater than the width, W2, of the ridge layer 28. At any given location along the longitudinal axis 17 in the tapered section 14, the width dimension of the slab layer 26 is greater than the width dimension of the ridge layer 28. The larger width dimension of the slab layer 26 in comparison with the ridge layer 28 continues into the non-tapered section 18. In particular, the slab layer 26 may have the width, W4, and the ridge layer 28 may have the width, W2, in the non-tapered section 18.

In the representative embodiment, the taper angle, $\theta$, of the inverse taper defined by the slab layer 26 may be equal to the taper angle, $\varphi$, of the inverse taper defined by the ridge layer 28. In such an embodiment with equal taper angles, the difference in the width dimension of the ridge layer 28 and the width dimension of the slab layer 26 is constant over the length of the tapered section 14. In an embodiment, the width dimensions of the slab layer 26 and the ridge layer 28 in the tapered section 14 may both vary linearly based on a linear function. In an embodiment, the slab layer 26 may be symmetrically arranged relative to the ridge layer 28 such that equal widths of the slab layer 26 are located adjacent to each of the side surfaces 22, 24 of the ridge layer 28 for linear width variations and equal taper angles.

In an alternative embodiment, the width dimensions of the slab layer 26 and the ridge layer 28 in the tapered section 14 may both vary non-linearly based on a non-linear function, such as a quadratic function or an exponential function. In an alternative embodiment, the width dimension of the slab layer 26 in the tapered section 14 may vary linearly based on a linear function, and the width dimension of the ridge layer 28 may vary non-linearly based on a non-linear function. In an alternative embodiment, the width dimension of the slab layer 26 in the tapered section 14 may vary non-linearly based on a non-linear function, and the width dimension of the ridge layer 28 may vary linearly based on a linear function.

The waveguide core 12 may be arranged over a dielectric layer 34. The waveguide core 12 may be comprised of a single-crystal semiconductor material, such as single-crystal silicon. In an embodiment, the single-crystal semiconductor material may originate from a device layer of a silicon-on-insulator (SOI) wafer that further includes a buried oxide layer providing the dielectric layer 34 and a substrate 36 comprised of a single-crystal semiconductor material, such as single-crystal silicon. The waveguide core 12 may be patterned from a layer of the single-crystal semiconductor material by lithography and etching processes during front-end-of-line processing of a photonics chip. In an embodiment, multiple patterning processes may be used to form the slab layer 26 and the ridge layer 28. For example, an initial etch mask having the shape of the slab layer 26 may be formed over the layer of the single-crystal semiconductor material and an etching process may be used to reproduce the shape in the layer by etching fully through the layer to the dielectric layer 34. Another etch mask having the shape of the ridge layer 28 may then be formed over the previously-etched layer of the single-crystal semiconductor material and another etching process may be used to etch partially through the previously-etched layer to define the slab layer 26.

In an alternative embodiment, the waveguide core 12 may be comprised of silicon nitride, silicon oxynitride, or aluminum nitride instead of single-crystal silicon. In an alternative embodiment, the substrate 36 may include a groove extending beneath the dielectric layer 34 as an under-cut immediately adjacent to the end surface 16.

The laser 20 may be configured to emit laser light of a given wavelength, intensity, mode shape, and mode size that is directed toward the end surface 16 of the waveguide core 12. The space between the laser 20 and the end surface 16 of the waveguide core 12 may be filled by air or, alternatively, may be filled by an index-matching material. The laser 20 may be comprised of III-V compound semiconductor materials. For example, the laser 20 may be an indium phosphide/indium-gallium-arsenic phosphide laser that is configured to generate and output continuous laser light in an infrared wavelength range. For example, the laser 20 may generate and output laser light at a nominal peak wavelength of 1310 nm or at a nominal peak wavelength of 1550 nm. The laser 20 may be located on the photonics chip including the waveguide core 12 or, alternatively, the laser 20 may be located off-chip. The laser 20 may be separately manufactured and may be attached to surfaces surrounding a cavity formed in the substrate 36 by, for example, flip-chip bonding.

Figure 3:
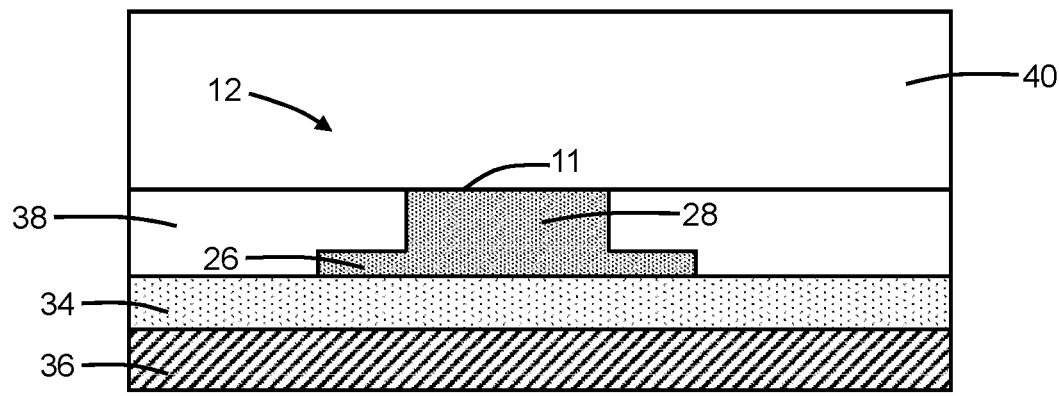
FIG. 3 is a cross-sectional view of the structure at a fabrication stage subsequent to FIG. 2.

With reference to FIG. 3 in which like reference numerals refer to like features in FIGS. 1, 2 and at a subsequent fabrication stage, a dielectric layer 38 is formed over the waveguide core 12. The dielectric layer 38 may be comprised of a dielectric material, such as silicon dioxide, deposited by chemical vapor deposition and planarized by, for example, chemical-mechanical polishing to remove topography. Below its top surface 11, the waveguide core 12 is embedded in the dielectric material of the dielectric layer 38. Additional dielectric layers (not shown) may be formed over the dielectric layer 38 and, for example, the additional dielectric layers may be respectively comprised of silicon nitride and silicon dioxide to define a heterogeneous dielectric layer stack.

A back-end-of-line stack 40 is formed over the dielectric layer 38. The back-end-of-line stack 40 includes one or more interlayer dielectric layers that may be comprised of dielectric material, such as silicon dioxide, and metallization comprised of, for example, copper or aluminum, that is arranged in the one or more interlayer dielectric layers.

The structure 10, in any of its embodiments described herein, may be integrated into a photonics chip that includes electronic components and additional optical components. For example, the electronic components may include field-effect transistors that are fabricated by CMOS front-end-of-line (FEOL) processing.

The structure 10 provides a monolithically-integrated edge coupler for efficient butt-end light coupling with the laser 20. The structure 10 may improve mode matching (i.e., the matching of mode shape and/or mode size) with the laser output to enhance the efficiency of the light coupling. The addition of the slab layer 26 may reduce the coupling loss and back reflection exhibited by the edge coupler, and may improve the transmission efficiency and power handling capability exhibited by the edge coupler. The structure 10 may permit the laser light to be coupled with active optical components of the photonics chip, such as modulators, without the need for an additional transition region between the non-tapered section 18 and the active optical components.

Figure 4:
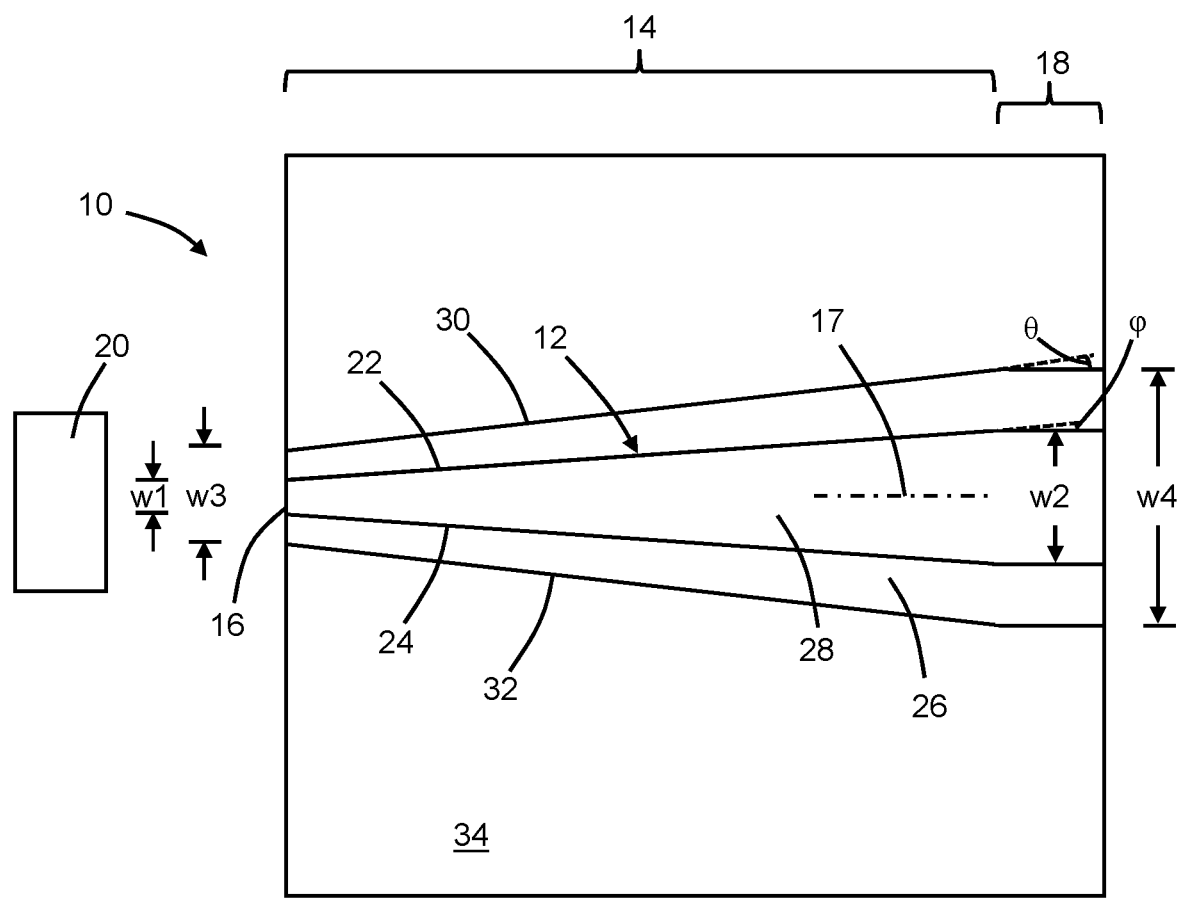
FIGS. 4-6 are top views of structures in accordance with alternative embodiments of the invention.

With reference to FIG. 4 in which like reference numerals refer to like features in FIG. 1 and in accordance with alternative embodiments of the invention, the taper angle, θ, of the inverse taper defined by the slab layer 26 and the taper angle, φ, of the inverse taper defined by the ridge layer 28 may be unequal. In the representative embodiment, the taper angle, θ, of the inverse taper defined by the slab layer 26 may be greater than the taper angle, φ, of the inverse taper defined by the ridge layer 28, and the taper angle difference increases the difference between the width, W4, and the width, W2.

Figure 5:
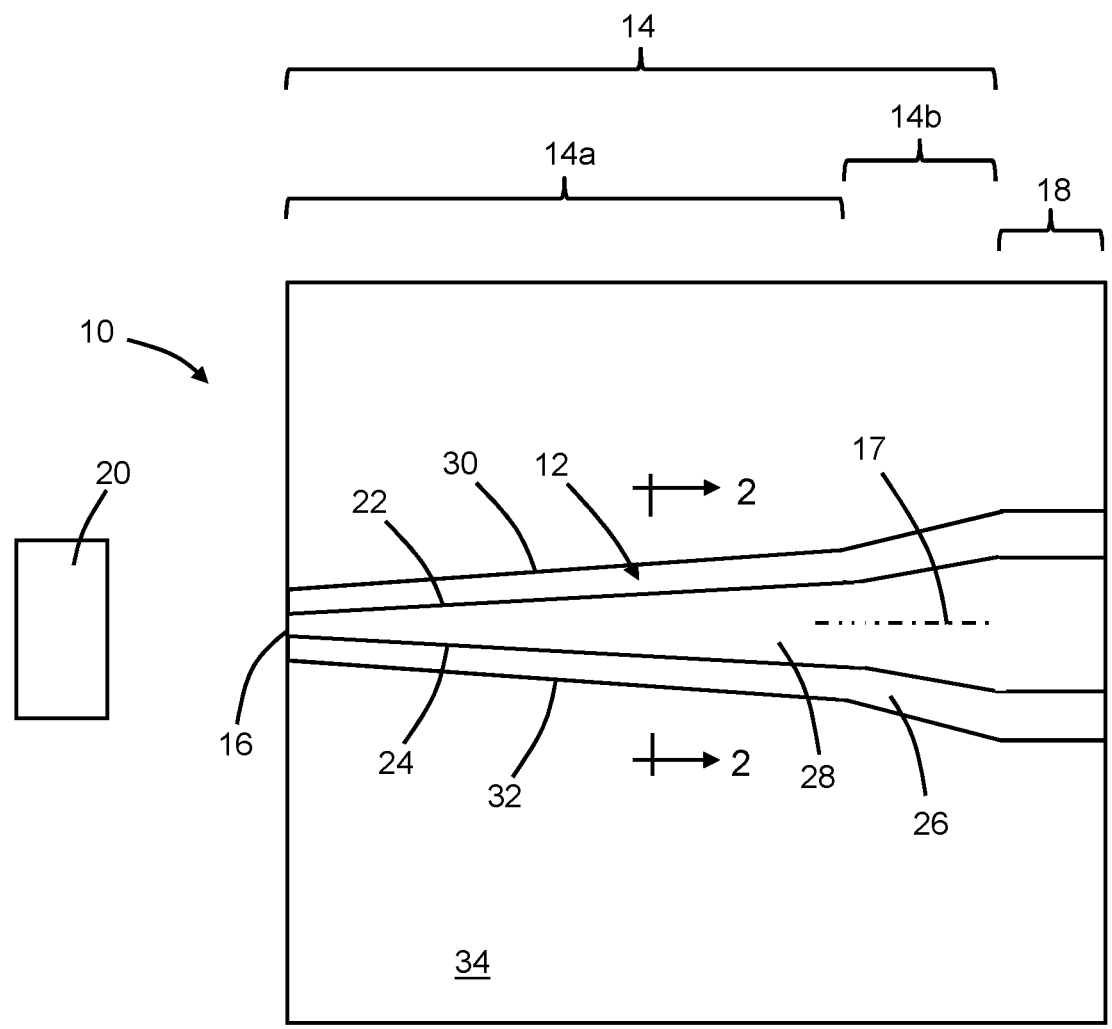

With reference to FIG. 5 in which like reference numerals refer to like features in FIG. 1 and in accordance with alternative embodiments of the invention, the tapering of the slab layer 26 in the tapered section 14 of the waveguide core 12 may include multiple taper angles, and the tapering of the ridge layer 28 in the tapered section 14 of the waveguide core 12 may also include multiple taper angles. In each instance, the multiple taper angles provide stages of a compound taper for the slab layer 26 and ridge layer 28 in the tapered section 14 of the waveguide core 12. In the representative embodiment, the slab layer 26 narrows with a taper angle in a portion 14a of the tapered section 14 adjacent to the end surface 16 and with a larger taper angle in a portion 14b of the tapered section 14. In the representative embodiment, the ridge layer 28 likewise narrows with a taper angle in a portion 14a of the tapered section 14 adjacent to the end surface 16 and with a larger taper angle in a portion 14b of the tapered section 14.

The lengths of the slab layer 26 and ridge layer 28 in the portion 14a of the tapered section 14 may be equal. The lengths of the slab layer 26 and ridge layer 28 in the portion 14b of the tapered section 14 may also be equal. In an alternative embodiment, the lengths of the tapered portions 14a, 14b of the slab layer 26 in the tapered section 14 may differ from the lengths of the tapered portions 14a, 14b of ridge layer 28 in the tapered section 14.

Figure 6:
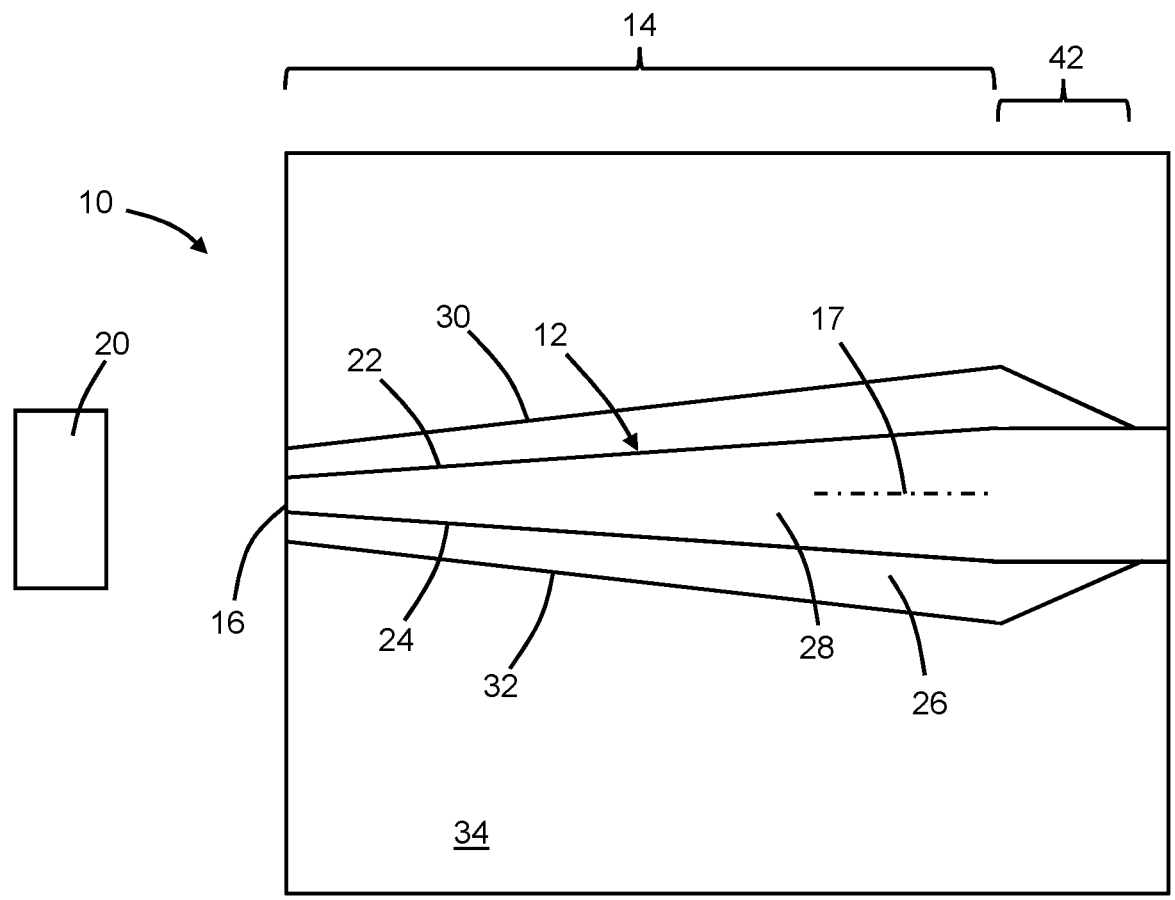

With reference to FIG. 6 in which like reference numerals refer to like features in FIG. 1 and in accordance with alternative embodiments of the invention, the slab layer 26 may include a transition region 42 that terminates the slab layer 26 at an end opposite to the termination provided by the end surface 16. The transition region 42 provides a coupler transitioning the waveguide core 12 from the rib-type waveguiding structure to a different type of waveguiding structure. The transition region 42 provides a transition from the tapered section 14 of the waveguide core 12 to a section of the waveguide core 12 in which the ridge layer 28 is present and the slab layer 26 is absent. The slab layer 26 in the tapered section 14 of the waveguide core 12 is longitudinally positioned along the longitudinal axis 17 between the transition region 42 of the slab layer 26 and the end surface 16. In an embodiment, the transition region 42 may be a taper that narrows in an opposite direction along the longitudinal axis 17 from the narrowing (i.e., inverse tapering) of the slab layer 26 in the tapered section 14. In an alternative embodiment, the ridge layer 28 may be coupled by an optical coupler (not shown) as a transition region that transfers the laser light upward to an overlying ridge waveguide core (not shown), such as an overlying ridge waveguide core comprised of silicon nitride.

Figure 7:
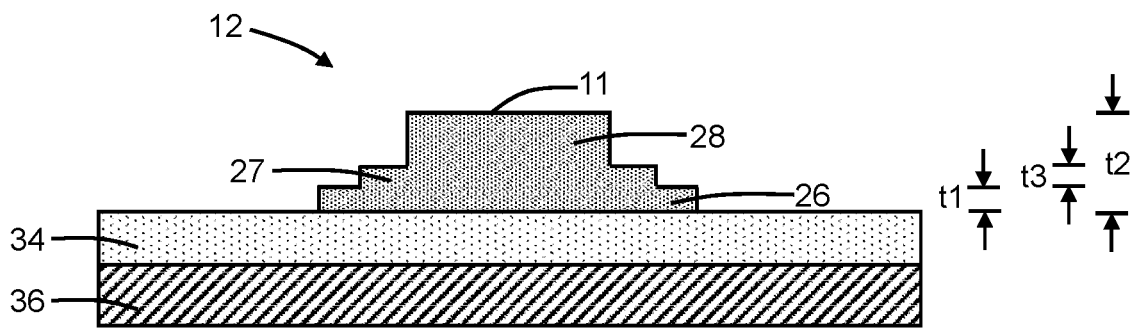
FIG. 7 is a cross-sectional view of a structure in accordance with alternative embodiments of the invention.

With reference to FIG. 7 in which like reference numerals refer to like features in FIG. 1 and in accordance with alternative embodiments of the invention, an additional slab layer 27 may be formed between the slab layer 26 and the ridge layer 28 to provide a composite slab layer. The slab layer 26 is positioned between the slab layer 27 and the dielectric layer 34, and the slab layer 27 is positioned between the ridge layer 28 and the slab layer 26. The slab layer 27 has a thickness, t3, that may be equal to or differ from the thickness, t1, of the slab layer 26. The slab layers 26, 27 each have a thickness that is less than the thickness, t2, of the ridge layer 28. The width dimension of the slab layer 26 is greater than the width dimension of the slab layer 27, and the width dimension of the ridge layer 28 is less than the width dimension of either the slab layer 26 or the slab layer 27. The structure 10 with multiple slab layers 26, 27 may provide a shape that improves the coupling with the laser 20.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a photonics chip, the structure comprising:
    an edge coupler including a waveguide core comprising single-crystal silicon, the waveguide core having a longitudinal axis, an end surface, a tapered section, and a non-tapered section adjoined to the tapered section, the tapered section and the non-tapered section positioned along the longitudinal axis with the tapered section between the non-tapered section and the end surface, the tapered section including a first slab layer and a ridge layer on the first slab layer, the first slab layer and the ridge layer each terminating at the end surface, the first slab layer having a first width dimension with a first width at a given location along the longitudinal axis of the waveguide core, the ridge layer having a second width dimension with a second width at the given location along the longitudinal axis of the waveguide core, and the first width greater than the second width; and
    a laser positioned adjacent to the end surface of the waveguide core,
    wherein the first width dimension of the first slab layer in the tapered section increases with increasing distance from the end surface, and the second width dimension of the ridge layer in the tapered section increases with increasing distance from the end surface.

2. The structure of claim 1 wherein the first slab layer and the ridge layer have equal taper angles in the tapered section.

3. The structure of claim 1 wherein the first slab layer and the ridge layer have unequal taper angles in the tapered section.

4. The structure of claim 1 wherein the ridge layer has a first taper angle in the tapered section, the first slab layer has a second taper angle in the tapered section, and the second taper angle is greater than the first taper angle.

5. The structure of claim 1 wherein the ridge layer includes a first plurality of taper angles in different portions of the tapered section, and the ridge layer includes a second plurality of taper angles in different portions of the tapered section.

6. The structure of claim 1 wherein the tapered section and the non-tapered section each include the first slab layer and the ridge layer.

7. The structure of claim 1 wherein the first slab layer and the ridge layer extend along a full length of the tapered section from the end surface to a transition with the non-tapered section.

8. The structure of claim 1 wherein the ridge layer has a first length along the longitudinal axis in the tapered section, the first slab layer has a second length along the longitudinal axis in the tapered section, and the second length is equal to the first length.

9. The structure of claim 1 further comprising:
    a substrate including a dielectric layer,
    wherein the waveguide core is positioned on the dielectric layer.

10. The structure of claim 1 wherein the tapered section of the waveguide core includes a second slab layer positioned between the ridge layer and the first slab layer, the second slab layer terminates at the end surface, and the second slab layer has a third width dimension that is greater than the second width dimension and less than the first width dimension.

11. The structure of claim 1 wherein the laser and the edge coupler are located on the photonics chip.

12. The structure of claim 1 wherein the laser comprises III-V compound semiconductor materials.

13. The structure of claim 9 wherein the laser is attached to the substrate.

14. A method of forming a structure for a photonics chip, the method comprising:
    forming an edge coupler having a waveguide core that includes a longitudinal axis, an end surface, a tapered section, and a non-tapered section adjoined to the tapered section, wherein the tapered section and the non-tapered section are positioned along the longitudinal axis with the tapered section between the non-tapered section and the end surface; and
    positioning a laser adjacent to the end surface of the waveguide core,
    wherein the waveguide core comprises single-crystal silicon, the tapered section of the waveguide core includes a slab layer and a ridge layer on the slab layer, the slab layer and the ridge layer each terminate at the end surface, the slab layer has a first width dimension with a first width at a given location along the longitudinal axis of the waveguide core, the ridge layer has a second width dimension with a second width at the given location along the longitudinal axis of the waveguide core, the first width dimension of the slab layer in the tapered section increases with increasing distance from the end surface, and the second width dimension of the ridge layer in the tapered section increases with increasing distance from the end surface, and the first width is greater than the second width.

15. The method of claim 14 wherein the slab layer and the ridge layer are patterned by multiple lithography and etching processes.

* * * * *